(12) United States Patent
Wu et al.

(10) Patent No.: US 10,984,617 B2
(45) Date of Patent: Apr. 20, 2021

(54) DATA SECURITY APPARATUS AND METHOD

(71) Applicant: LENOVO Enterprise Solutions (Singapore) PTE. LTD., New Tech Park (SG)

(72) Inventors: Morgan Wu, New Taipei (TW); Makoto Ono, Chapel Hill, NC (US); Thou Vun Pang, Taipei (TW); Yueh-Ku Chung, Taipei (TW); Scott A. Piper, Kirkland, WA (US); Hsiang Lung Yu, Taichung (TW)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 16/692,989

(22) Filed: Nov. 22, 2019

(65) Prior Publication Data
US 2020/0168016 A1 May 28, 2020

(30) Foreign Application Priority Data
Nov. 22, 2018 (CN) .......................... 201811396803.8

(51) Int. Cl.
*G07C 9/00* (2020.01)
*G07F 7/10* (2006.01)
*G06Q 20/34* (2012.01)
*G07C 9/25* (2020.01)

(52) U.S. Cl.
CPC ....... *G07C 9/00309* (2013.01); *G06Q 20/341* (2013.01); *G07C 9/00571* (2013.01); *G07C 9/00896* (2013.01); *G07C 9/257* (2020.01); *G07F 7/1008* (2013.01); *G07C 2009/00769* (2013.01)

(58) Field of Classification Search
CPC .......................... G07C 9/00309; G07C 9/257; G07C 9/00571; G07C 9/00896; G07C 2009/00769; G07F 7/1008; G06Q 20/341
See application file for complete search history.

(56) References Cited

U.S. PATENT DOCUMENTS

| | | | | |
|---|---|---|---|---|
| 8,490,868 B1 * | 7/2013 | Kropf | .................. | G06Q 20/108 235/379 |
| 8,854,180 B2 * | 10/2014 | Bacarella | ................ | E05G 1/026 340/5.6 |
| 8,918,651 B2 * | 12/2014 | Greco | .................... | G06F 21/80 713/189 |
| 9,466,385 B1 * | 10/2016 | Hayter | .................... | G11C 16/22 |
| 9,980,020 B1 * | 5/2018 | Sharp | .................... | E05B 43/005 |
| 10,341,310 B1 * | 7/2019 | Leon | .................... | H04L 9/0894 |

(Continued)

*Primary Examiner* — Brian E Miller
(74) *Attorney, Agent, or Firm* — Kunzler Bean & Adamson; Bruce R. Needham (57) ABSTRACT

The present disclosure provides a computing apparatus and a method for securing access to the computing device. The computing apparatus comprises a housing, a data storage device disposed in the housing, a cover movably coupled to the housing to secure the data storage device in the housing, and a controller coupled to the data storage device. The controller is configured to grant access to the data storage device upon detecting an authorized attempt of opening the cover and to deny access to the data storage device upon detecting an unauthorized attempt of opening the cover.

19 Claims, 7 Drawing Sheets

(56) References Cited

U.S. PATENT DOCUMENTS

| | | | |
|---|---|---|---|
| 2004/0099733 A1* | 5/2004 | Brookner | G07C 9/00658 235/382 |
| 2006/0211490 A1* | 9/2006 | Falvey | G07F 17/3241 463/29 |
| 2011/0140831 A1* | 6/2011 | Michael | A47B 88/40 340/3.31 |
| 2015/0050990 A1* | 2/2015 | Colvin | G07F 17/3241 463/25 |
| 2016/0189450 A1* | 6/2016 | Anderson | G06K 19/07381 340/5.51 |
| 2018/0134521 A1* | 5/2018 | Beauchaud | B66B 1/28 |
| 2018/0227754 A1* | 8/2018 | Paez Velazquez | G04G 21/00 |
| 2019/0095353 A1* | 3/2019 | Hoerger | G06F 3/0637 |
| 2019/0130086 A1* | 5/2019 | Tovey | H04L 9/3247 |
| 2019/0306663 A1* | 10/2019 | Ruth | H04W 4/029 |
| 2019/0362080 A1* | 11/2019 | Achillopoulos | G06F 11/3476 |
| 2020/0086939 A1* | 3/2020 | Iseman | B62H 5/20 |
| 2020/0168016 A1* | 5/2020 | Wu | G07F 7/1008 |
| 2020/0186342 A1* | 6/2020 | Zhang | H04L 9/0891 |

\* cited by examiner

DATA SECURITY APPARATUS AND METHOD

CROSS-REFERENCE TO RELATED APPLICATIONS

This patent application claims priority to China Patent Application No. 201811396803.8 filed on Nov. 22, 2018 for Morgan Wu, the entire contents of which are incorporated herein by reference for all purposes.

FIELD

The subject matter disclosed herein to a data security apparatus and method and in particular, to a computing apparatus and method for securing access to the computing apparatus.

BACKGROUND

Conventional data storage device secured in a housing in a computing system includes a Self-Encryption Drive (SED) for encrypting the data to prevent unauthorized access in situations where the housing is intruded. No solution is available in known data security apparatuses and methods which is capable of determining access grant to authorized user. It is therefore desirable to provide a data security apparatus which is capable of assessing a nature of attempted access to the data storage device based on predetermined criteria and determine access grant or denial accordingly.

BRIEF SUMMARY

An apparatus for data security apparatus is disclosed. A method and computer program product also perform the functions of the apparatus. In one aspect, the present disclosure provides a computing apparatus comprising a housing, a data storage device disposed in the housing, a cover movably coupled to the housing to secure the data storage device in the housing, and a controller coupled to the data storage device. The controller is configured to grant access to the data storage device upon detecting an authorized attempt of opening the cover and to deny access to the data storage device upon detecting an unauthorized attempt of opening the cover.

In another aspect, the present disclosure provides a method for securing access to a computing device. The method includes detecting an attempt of opening a cover of the computing apparatus having a data storage device disposed therein, and determining a nature of the attempt. Upon the nature being determined as an authorized attempt, access to the data storage device is granted. Upon the nature being determined as an unauthorized attempt, access to the data storage device is denied.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in conjunction with the figures, is not intended to limit the scope of the embodiments, as claimed, but is merely representative of example embodiments.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, that the various embodiments be practiced without one or more of the specific details, or with other methods, components, materials, etc. In other instances, some or all known structures, materials, or operations may not be shown or described in detail to avoid obfuscation.

Aspects of the embodiments are described below with reference to schematic flowchart diagrams and/or schematic block diagrams of methods, apparatuses, systems, and program products according to embodiments. It will be understood that one or more blocks of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Figure 6:
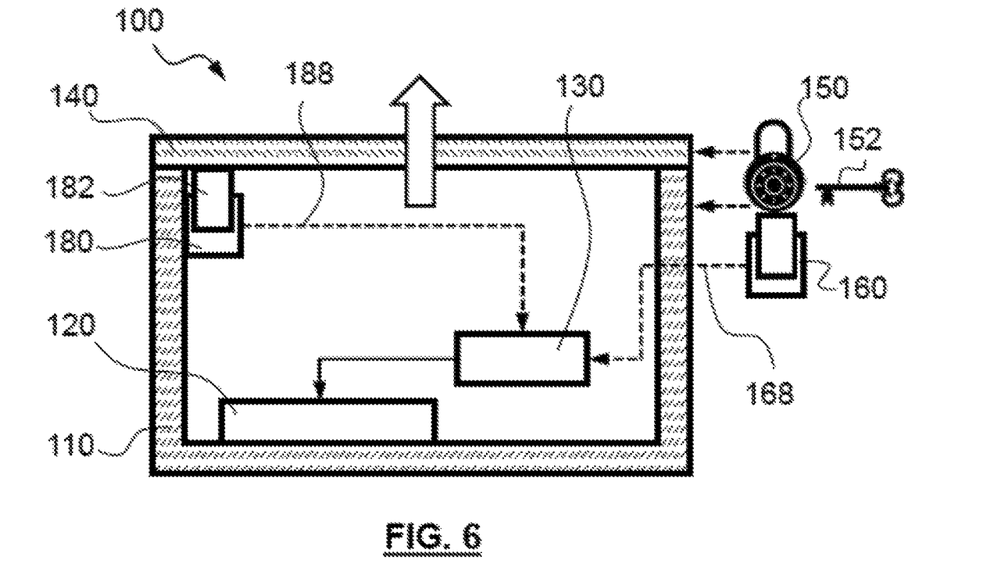
FIG. 6 is a schematic diagram depicting a data security apparatus of the embodiment shown in FIG. 1.
Figure 7:
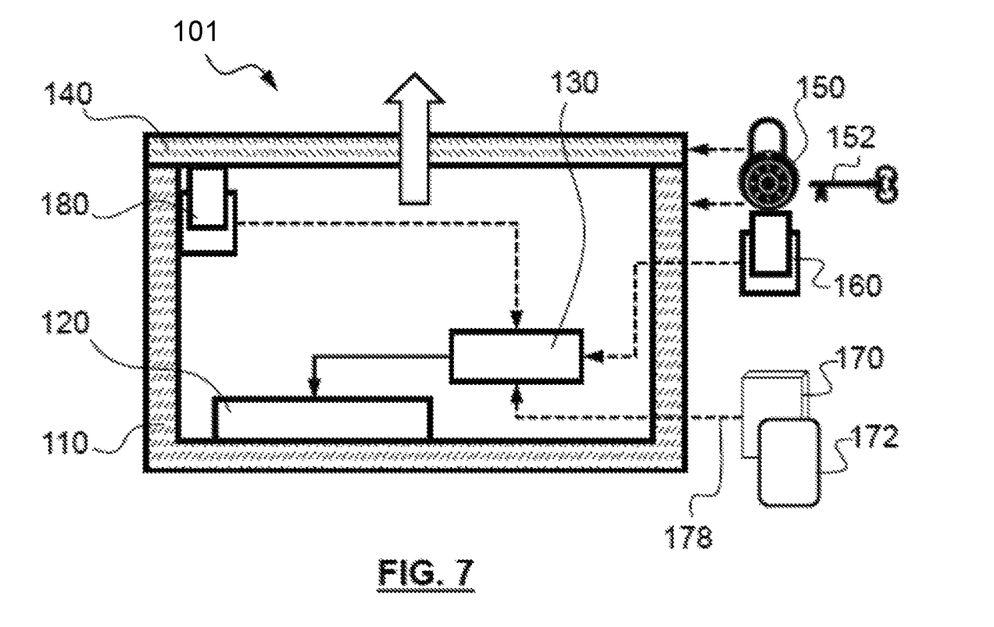
FIG. 7 is a schematic diagram depicting a data security apparatus according to another embodiment.

As shown in FIGS. 1 to 6, according to one embodiment, a data security apparatus 100 (for example, a computing device such a Lenovo x86 computing server) includes a housing 110, a data storage device 120 (for example, a self-encryption drive (SED)) disposed in the housing 110, a cover 140 movably coupled to the housing 110 and a controller 130 in signal communication with the data storage device 120; see FIGS. 6 and 7. The cover 140 is operable to close the housing 110 to secure the data storage device 120 in the housing 110. The cover 140 may be opened to enable retrieval of the data storage device 120 from the housing 110.

The controller 130, in some embodiments, is an electronic device integrated to the data storage device 120. In other embodiments, the controller 130 is a separate component disposed in the housing 110 and electrically coupled to the data storage device 120. The controller 130 is configured to grant access to the data storage device 120 by decrypting the data in the data storage device 120, upon detecting an authorized attempt of opening the cover 140, and to deny access to the data storage device 120 by encrypting the data in the data storage device 120, upon detecting an unauthorized attempt of opening the cover 140.

The data security apparatus 100, in some embodiments, includes a lock 150 coupled to the housing 110 and the cover 140, to lock the cover 140 to the housing 110. In some embodiments, the controller 130 is configured such that, upon the lock 150 being unlocked by a key 152, the controller 130 is configured to determine that the key 152 unlocking the lock 150 is an authorized attempt to open the cover 140, which is an operation following a Standard Operation Procedure (SOP). Upon determining the attempt is of an authorized nature, the controller 130 is configured to grant access to the data storage device 120, by decrypting the data in the data storage device 120. Conversely, in other embodiments, if the cover 140 is opened without the key 152 unlocking the lock 150, the controller 130 is configured to determine that the cover 140 is opened without following the SOP, i.e. under an unauthorized attempt, and accordingly the controller 130 is configured to deny access to the data storage device 120, by encrypting the data in the data storage device 120.

Figures 4, 5:
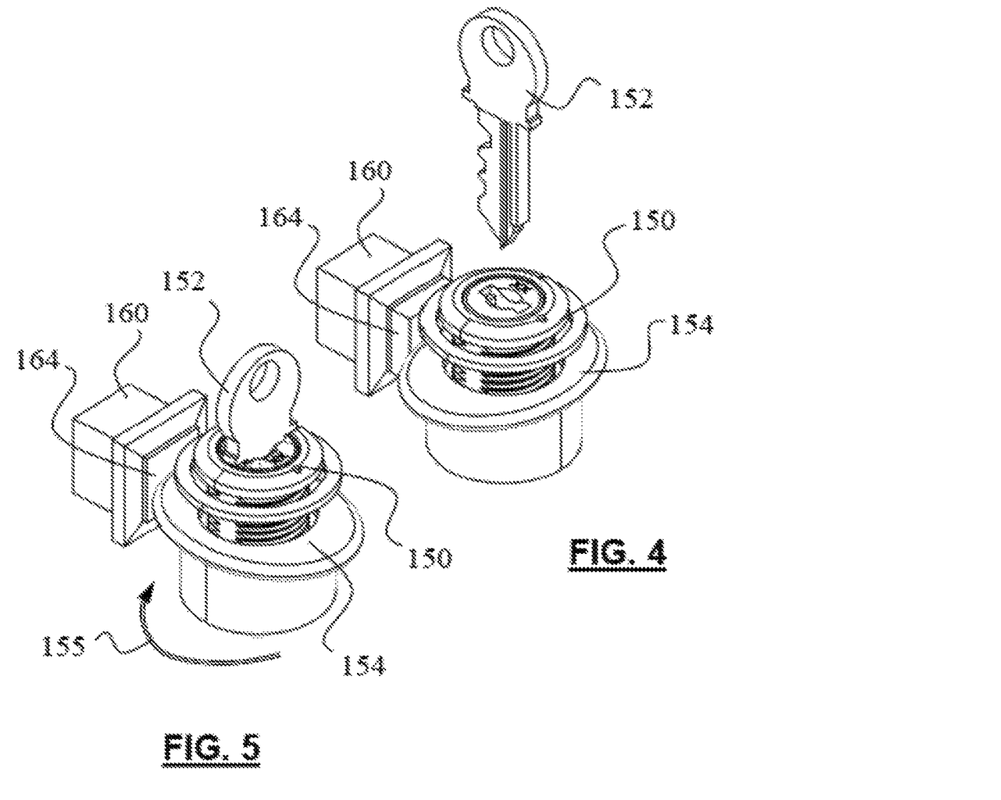
FIG. 4 is a perspective view showing a lock of the apparatus in FIG. 3 and a first switch coupled to the lock, in which the lock is at a locked position.
FIG. 5 is a perspective view showing a lock of the apparatus in FIG. 3 and a first switch coupled to the lock, in which the lock is at an unlocked position.

The data security apparatus 100, in some embodiments, includes a first switch 160 coupled to the lock 150 and the controller 130. As shown in FIGS. 4 and 5, the operation of the key 152 unlocking the lock 150 causes a rotational movement 155 of a cam 154 pressing a switch button 164 to trigger the first switch 160 to generate a first signal 168 which is transmitted to the controller 130. The first signal 168 received by the controller 130 is determined as an authorized attempt of opening the cover 140, upon which, the controller 130 is configured to grant access to the data storage device 120, by decrypting the data in the data storage device 120.

Figure 1:
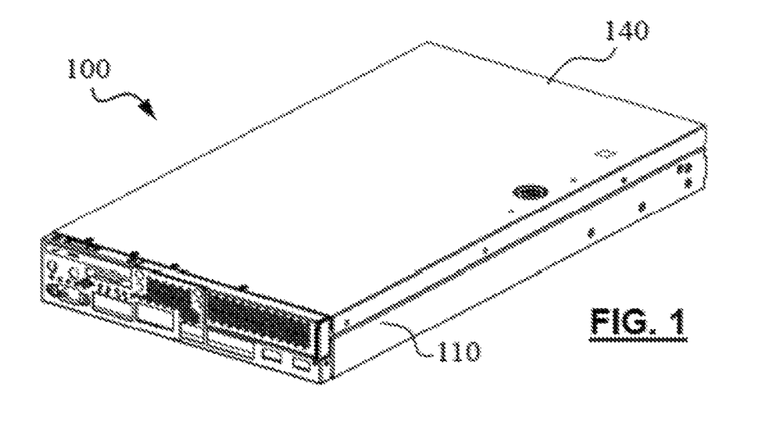
FIG. 1 is a perspective view of a data security apparatus according to one embodiment.
Figure 2:
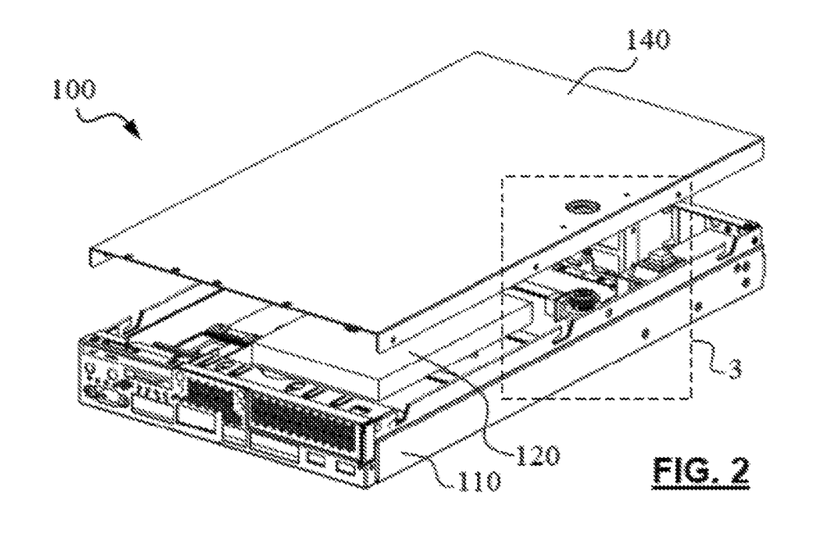
FIG. 2 is a partial exploded view of FIG. 1.
Figure 3:
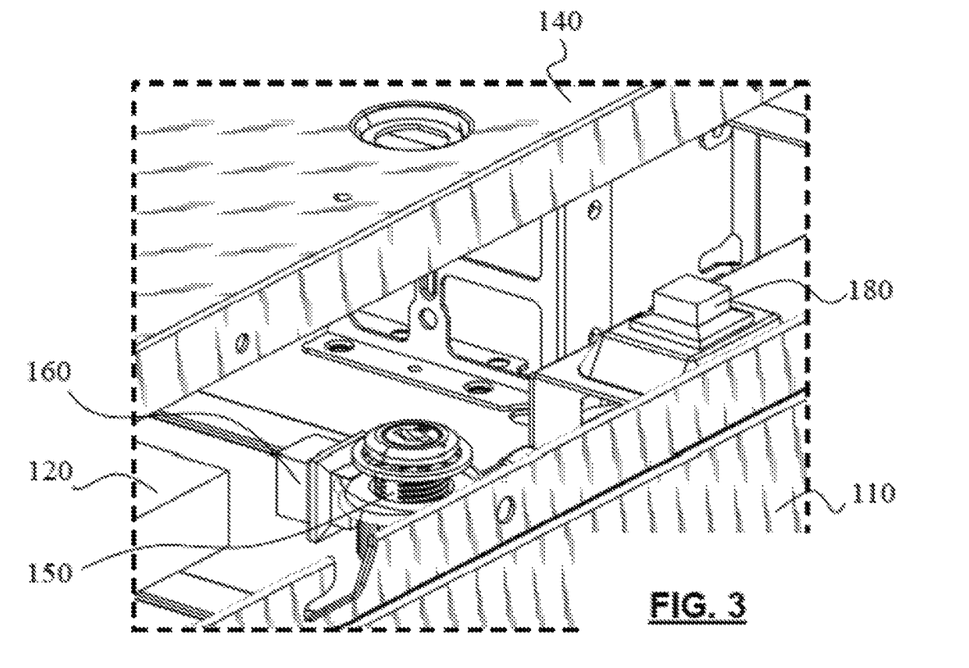
FIG. 3 an enlarged view of portion 3 of FIG. 2.

As shown in FIGS. 3 and 6, the data security apparatus 100, in some embodiments, includes a second switch 180 coupled to the cover 140. The second switch 180, in some embodiments, is a limit switch configured to detect a positional relationship between the cover 140 and the housing 110. Movement of the cover 140 from the closed position to at least a partially open position will trigger the second switch 180, e.g. by releasing a switch button 182, to generate a second signal 188 which is transmitted to the controller 130. In some embodiments, in combination with the first signal 168 received from the first switch 160, the controller 130 is configured to determine of the nature of attempt of opening the cover 140, as illustrated in Table 1 below:

TABLE 1

| SN | Action (cover-open attempt) | First switch (value/status) | Second switch (value/status) | Result |
|---|---|---|---|---|
| 1 | Default status - no cover-open attempt | 1 (cover locked) | 1 (cover closed) | Data remains encrypted |
| 2 | Cover forced-open without key-unlocking | 1 (cover locked) | 0 (cover open) | Unauthorized data access denied |
| 3 | Cover unlocked and remains closed | 0 (cover unlocked) | 1 (cover closed) | Authorized data access granted |
| 4 | Cover unlocked and is opened | 0 (cover unlocked) | 0 (cover open) | Authorized data access granted and enabled |

As shown in Table 1, scenario 1 (SN-1) indicates a situation where no attempt of opening the cover is performed. The first switch 160 and the second switch 180 are both valued "1" i.e. corresponding to "cover locked" and "cover closed" status. The data in the data storage device 120 remains encrypted. In a situation where the cover 140 is forced-open without a key 152 unlocking the cover, as illustrated in Table 1 under "SN-2", the first switch 160 remains at value "1" indicating a "cover locked" status. In the meantime, the second switch 180 changes the value to "0" indicating that the cover 140 is open. Upon receipt of the value/status of both the first switch 160 with a value of "1" and the second switch 180 with a value of "0," the controller 130 is configured to determine that the cover is open under an unauthorized attempt and accordingly, the controller 130 is configured to act to deny access to the data storage device 120.

In a situation where the cover is unlocked by a key 152, as illustrated under "SN-3" in Table 1, the first switch 160 changes the value to "0" indicating that the lock 150 is unlocked by the key 152, and sends a first signal 168 to the controller 130. Upon receipt of the first signal 168 from the first switch 160, the controller 130 is configured to determine that an authorized attempt of opening the cover takes place, and to grant access to the data storage device 120 by decrypting the data in the data storage device 120.

The situation under "SN-4" in Table 1 advances further from "SN-3" in that, with the key 152 unlocking the lock 150 and with the cover 140 being opened, so that the second switch 180 changes to a value of "0", and sends a second signal 188 to the controller 130. In combination with the first signal 168 received from the first switch 160, the controller 130 is configured to determine that the cover-opening attempt is authorized and that the cover is opened both under SOP, and is configured to grant and enable access to the data in the data storage device 120.

According to another embodiment, as shown in FIG. 7, a data security apparatus 101 may include an identification device, for example a Near Field Communication (NFC) reader 170 coupled to the controller 130. Upon the NFC reader 170 receiving authorized identification information, e.g. a presence of correct or authorized NFC card 172, the NFC reader 170 is configured to send an acceptance signal 178 to the controller 130. The acceptance signal 178 received by the controller 130 is determined as an authorized attempt of opening the cover 140 by following the SOP, upon which, the controller 130 is configured to grant access to the data storage device 120, by decrypting the data in the data storage device 120. Conversely, in situations where an incorrect or unauthorized card is presented, the NFC reader 170 will not generate any acceptance signal and accordingly, no access will be granted by the controller 130 to the data storage device 120, i.e. the data in the data storage device 120 is configured to remain encrypted to deny the data access.

As alternatives of an NFC reader 170, other types of identification devices may be used to couple to the controller 130 and to perform similar operations for user identification. For example, the NFC reader 170 may be replaced with a key pad for password entry, a socket for receiving a dongle, a camera for capturing a barcode/QR code, a fingerprint reader for fingerprint scanning, etc.

In the embodiment shown in FIG. 7, an identification device e.g. NFC reader 170 is used as an additional security measure for data access control. The controller 130 is configured to determine an authorized attempt upon receiving both a first signal 168 from the first switch 160 and an acceptance signal 178 from the NFC device 170, to determine data access enablement in combination of the second signal 188 received from the second switch 180, as illustrated in Table 2 below.

TABLE 2

| SN | Action (cover-open attempt) | NFC reader (value/status) | First switch (value/status) | Second switch (value/status) | Result |
|---|---|---|---|---|---|
| 1 | Default status - no cover-open attempt | 1 (No NFC card presented) | 1 (cover locked) | 1 (cover closed) | Data remains encrypted. |
| 2 | Cover forced-open without correct NFC card or key-unlocking | 1 (NFC card not present/ unaccepted) | 1 (cover locked) | 0 (cover opened) | Unauthorized attempt - Data access denied |
| 3 | Cover opened or forced-open without correct NFC card | 1 (NFC card not present/ unaccepted) | 0 (card unlocked) | 0 or 1 (cover opened or closed) | Unauthorized attempt - Data access denied |

TABLE 2-continued

| SN | Action (cover-open attempt) | NFC reader (value/status) | First switch (value/status) | Second switch (value/status) | Result |
|---|---|---|---|---|---|
| 4 | Cover forced-open without key-unlocking | 0 (Authorized NFC card presented) | 1 (cover locked) | 0 (cover opened) | Unauthorized attempt - Data access denied |
| 5 | Authorized NFC card presented + Key unlocking Cover closed | 0 (Authorized NFC card presented) | 0 (cover unlocked) | 1 (cover closed) | Authorized attempt - Data access granted |
| 6 | Authorized NFC card presented + Key unlocking Cover opened | 0 (Authorized NFC card presented) | 0 (cover unlocked) | 0 (cover open) | Authorized attempt - Data access granted and enabled |

As shown in Table 2, in scenario 1 (SN-1), no attempt of opening the cover is performed. The NFC reader 170, the first switch 160 and the second switch 180 are all valued "1" i.e. corresponding to a "No NFC card presented", "cover locked" and "cover closed" situation. The data in the data storage device 120 remains encrypted. In a situation where the cover is forced-open without a correct NFC card 172 presented or without a key 152 unlocking the cover, as illustrated in Table 2 under "SN-2", the NFC reader 170 and the first switch 160 remain at value "1" indicating a "cover locked" status. Under SN-3, the cover is unlocked by a key 152 which changes the first switch 160 value to "0." Under SN-4, a correct NFC card 172 is presented by which the NFC reader value changes to "0." SN-2, SN-3 and SN-4 do not satisfy criteria of the controller 130 for an authorized attempt, as at least one of the NFC reader value and the first switch 160 value remains as "1." Accordingly, regardless of whether the second switch 180 has a value as "1" or "0," no data access will be granted under SN-2, SN-3 and SN-4.

In a situation where both a correct NFC card 172 is presented and a key 152 unlocks the cover 140, as shown under SN-5, the controller 130 is configured to determine the authorized attempt has been met, and is configured to grant access to the data in the data storage device 120.

The situation under "SN-6" in Table 6 advances further from "SN-5" in that, with the corrected NFC card 172 presented, the key 152 unlocking the lock 150 and with the cover opened, the second switch 180 changes the value to "0", and sends a second signal 188 to the controller 130. In combination with the acceptance signal 178 received from the NFC reader 170 and the first signal 168 received from the first switch 160, the controller 130 is configured to determine the cover-opening attempt being authorized and cover being opened under SOP, and is configured to grant and enable access to the data in the data storage device 120.

Figure 8:
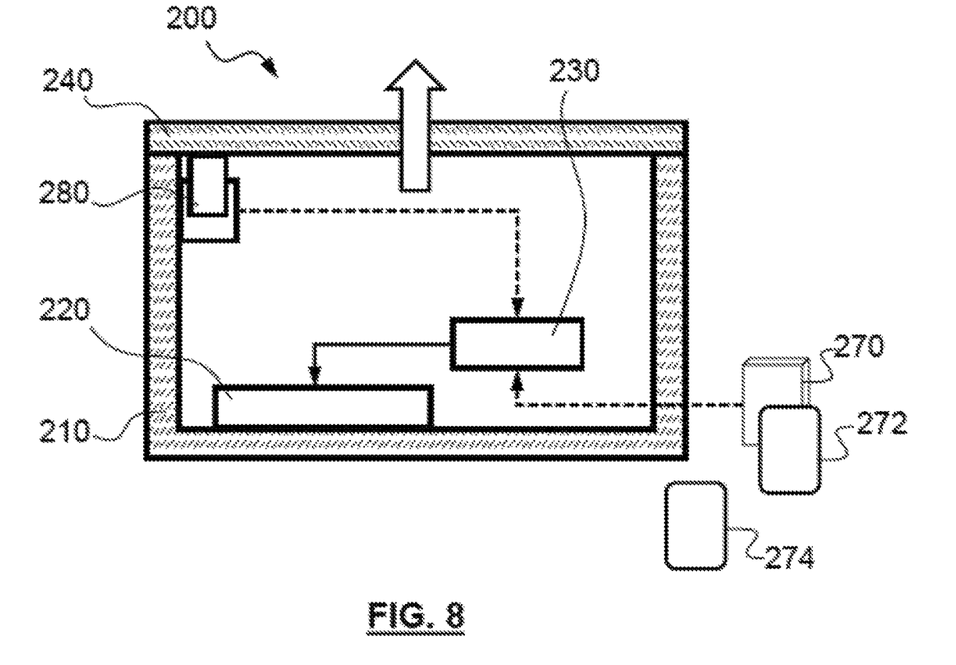
FIG. 8 is a schematic diagram depicting a data security apparatus according to yet another embodiment.

According to yet another embodiment, as shown in FIG. 8, a data security apparatus 200 includes an NFC reader 270 coupled to a controller 230, as an alternative of the lock 150 and the first switch 160 used in the data security apparatus 100 of the previous embodiment, to perform user identification for determining an attempt of opening the cover 240 from the housing 210. In the present embodiment, upon the NFC reader 270 detecting the presence of an authorized NFC card 272, the controller 230 is configured to determine an authorized attempt of opening the cover 240 and grant access to the data storage device 220 secured in the housing 210. Conversely, if the cover 240 is force-opened after the NFC reader 270 detecting the presence of an unauthorized NFC card 274, or in situations where no NFC card is presented, the controller 230 is configured to determine an unauthorized attempt of opening the cover 240 and is configured to deny access to the data storage device 220.

The data security apparatus 200 includes a second switch 280 coupled to the cover 240. The second switch 280 may be a limit switch configured to detect the positional relationship between the cover 240 and the housing 210. Movement of the cover 240 from the closed position at least partially toward the open position will trigger the second switch 280 to generate a second signal transmitted to the controller 230. In combination with the acceptance signal 178 received from the NFC reader 270, the controller 230 performs determination of the nature of attempt of opening the cover, as illustrated in Table 3 below:

TABLE 3

| SN | Action (cover-open attempt) | NFC reader (value/status) | Second switch (value/status) | Result |
|---|---|---|---|---|
| 1 | Default status - no cover-open attempt | 1 (No NFC card presented) | 1 (cover closed) | Data remain encrypted. |
| 2 | Cover forced-open without correct NFC card | 1 (NFC card not present/unaccepted) | 0 (cover open) | Unauthorized attempt - Data access denied |
| 3 | Authorized NFC card presented | 0 (Authorized NFC card presented) | 1 (cover closed) | Authorized attempt- Data access granted |
| 4 | Authorized NFC card presented | 0 (Authorized NFC card presented) | 0 (cover open) | Authorized attempt- Data access granted and enabled |

As illustrated in Table 3, in scenario 1 (SN-1), no attempt of opening the cover is performed. The NFC reader 270 and the second switch 280 are both valued "1" i.e. corresponding to a "no NFC card presented" and "cover closed" situation. The data in the data storage device 220 remains encrypted. In a situation where the cover is forced-open without an NFC card or a correct NFC card 272 presented, as illustrated in Table 1 under "SN-2", the NFC reader 270 remains at value "1." In the meantime, the second switch 280 changes the value to "0" indicating the cover is opened. Upon receipt of the value/status of both the NFC reader 270 with a value of "1" and the second switch 280 with a value of "0," the controller 230 is configured to determine that the cover 240 is opened under an unauthorized attempt and accordingly, the controller 230 denies access to the data in the data storage device 220.

In a situation where an authorized NFC card 272 is presented, as illustrated under "SN-3", the NFC reader 270 changes the value to "0" indicating an authorized user's attempt, and sends an acceptance signal to the controller 230. Upon receipt of the acceptance signal from the NFC reader 270, the controller 230 is configured to determine that an authorized attempt of opening the cover 240 takes place, and is configured to grant access to the data in the data storage device 220.

The situation under "SN-4" in Table 3 advances further from "SN-3" in that, with the authorized NFC card 272 presented and the cover 240 opened, the second switch 280 changes the value to "0", and send a second signal to the controller 230. In combination with the acceptance signal received from the second switch 280, the controller 230 is configured to determine that both the cover-opening attempt is authorized and that the cover 240 is opened under SOP, and is configured to grant and enable access to the data in the data storage device 220.

Figure 9:
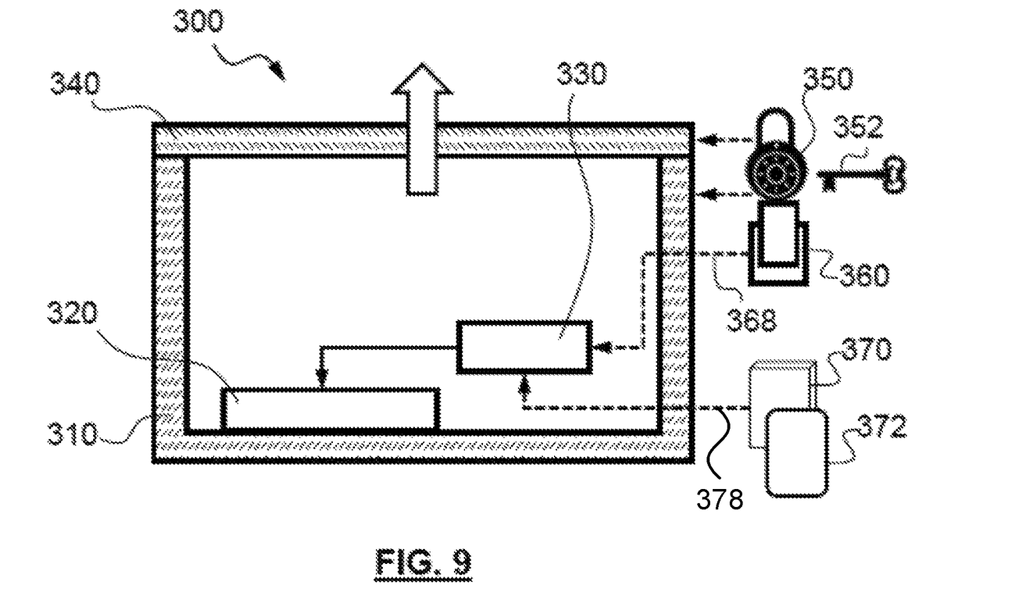
FIG. 9 is a schematic diagram depicting a data security apparatus according to still another embodiment.

According to a further embodiment, as shown in FIG. 9, a data security apparatus 300 includes a housing 310, a data storage device 320 disposed in the housing 310, a cover 340 movably coupled to the housing 310 and a controller 330 in signal communication with the data storage device 320. The cover 340 is operable to open and close the housing 310. When closed and locked to the housing 310, the cover 340 secures the data storage apparatus 320 in the housing 310.

The data security apparatus 300 includes a lock 350 coupled to the housing 310 and the cover 340, to lock the cover 340 to the housing 310, and an identification device e.g. an NFC reader 370 coupled to the controller 330.

A first switch 360 is coupled to the lock 350 and the controller 330. A key 352 unlocking the lock 350 triggers the first switch 360 to generate a first signal 368 which is transmitted to the controller 330. The first signal 368 received by the controller 330 is determined to satisfy a first authorized attempt of opening the cover 340.

Upon detecting the presence of an authorized NFC card 372, the NFC reader 370 send an acceptance signal 378 to the controller 330. The acceptance signal 378 received by the controller 330 is determined to satisfy a second authorized attempt of opening the cover 340.

The controller 330 is configured to grant access to the data storage device 320 upon receipt of both the first signal 368 from the first switch 360 corresponding to a key 352 unlocking the lock 350, and the acceptance signal 378 from the NFC reader 370 corresponding to the presence of an authorized card. Conversely, if any one or both of the first signal 368 and the acceptance signal 378 is not received, the controller 330 is configured to determine an unauthorized attempt of opening the cover, and is configured to deny access to the data in the data storage device 320.

Figure 10:
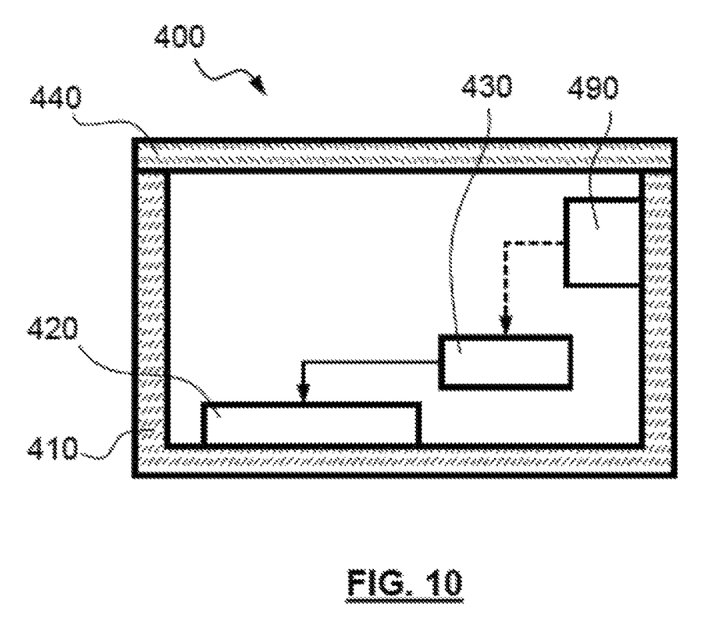
FIG. 10 is a schematic diagram depicting a data security apparatus according to a further embodiment.
Figure 11:
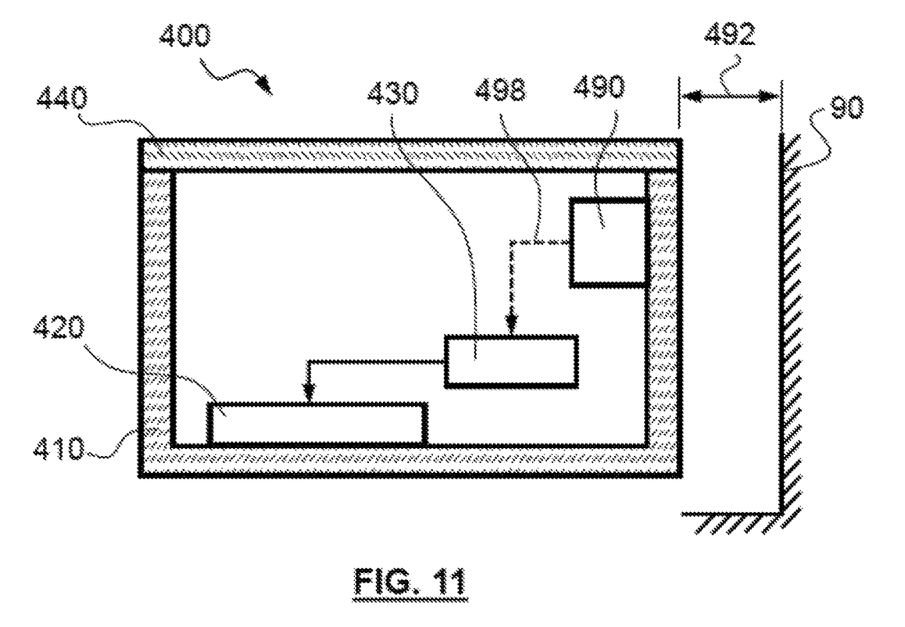
FIG. 11 is a schematic diagram showing the data security apparatus of FIG. 10 and a reference location to which the data security apparatus is positioned.

According to a further embodiment, as shown in FIGS. 10 and 11, a data security apparatus 400 includes a housing 410, a data storage device 420 disposed in the housing 410, a cover 440 movably coupled to the housing 410, a controller 430 in signal communication with the data storage device 420, and a sensor 490 mounted to the housing 410 and coupled to the controller 430.

The sensor 490 is configured to detect a movement of the housing 410 from a reference location e.g. a data center 90 in which the data security apparatus 400 is deployed. Upon the sensor 490 detecting a movement of the housing 410, e.g. a movement beyond a predetermined distance 490, the sensor 490 is configured to send a third signal 498 to the controller 430. Upon receipt of the third signal 498, the controller 430 is configured to determine that an abnormal situation has taken place, e.g. the data security apparatus 400 being moved away from the data center 90, and is configured to deny access to the data storage device 420 by encrypting the data in the data storage device 420.

The sensor 490 may be a location sensor capable of detecting a position of the housing 410 relative to the location reference 90. Alternatively, the sensor 490 may be a motion sensor such as an accelerometer configured to detect a movement of the housing 410, and to derive a movement distance of the housing 410 based on the acceleration detected.

The embodiment shown in FIGS. 10 and 11 may be implemented in combination with any one or more of the data security apparatuses illustrated in the previous embodiments to provide a comprehensive solution for data security control.

Figure 12:
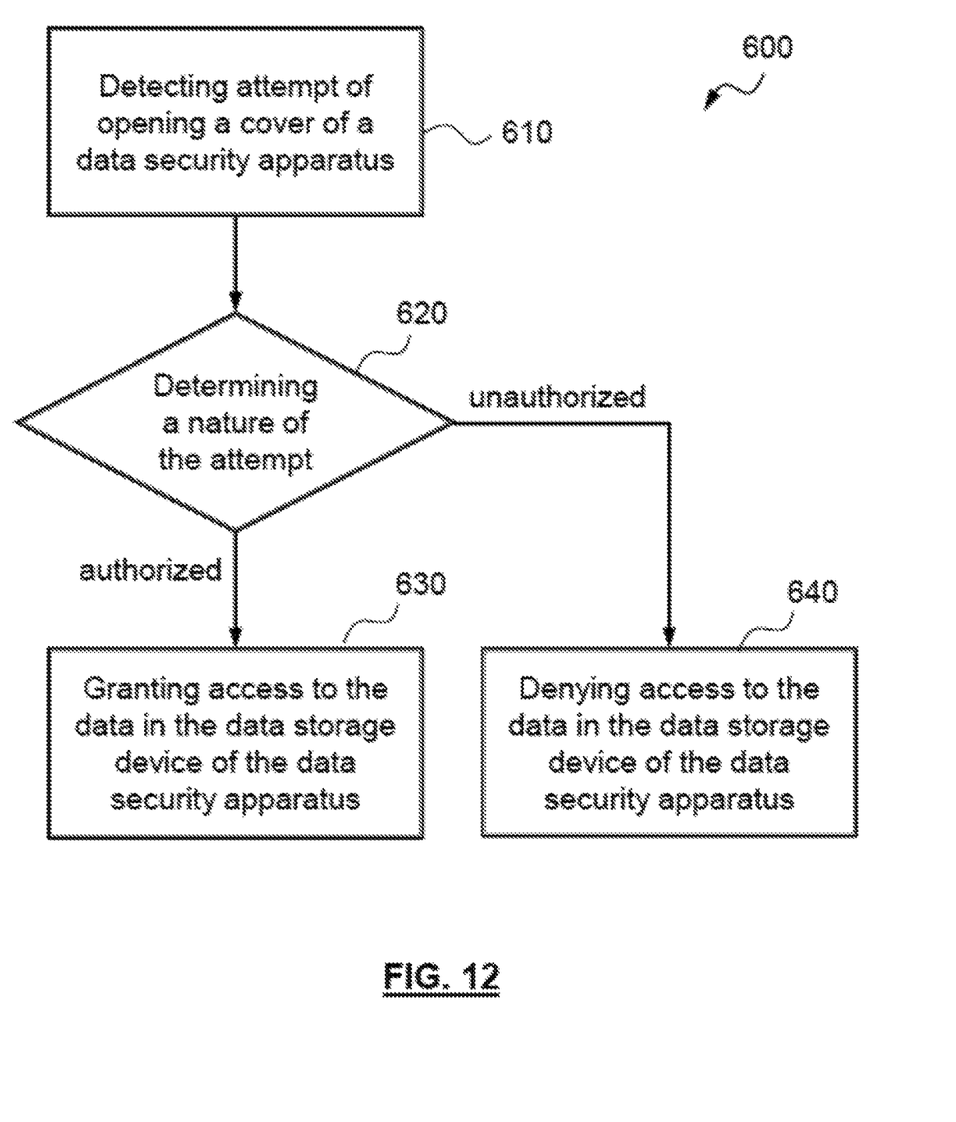
FIG. 12 is a flow chart showing a method for securing access to a data storage device according to one embodiment.

FIG. 12 shows a method 600 for securing access to a data storage device according to one embodiment. At block 610, an attempt of opening a cover that secures a data storage device in a data security apparatus is detected. At block 620, a nature of the attempt of opening a cover is determined. At block 630, upon the nature of the attempt being determined as an authorized attempt, access to the data in the data storage device is granted. At block 640, upon the nature of the attempt being determined as an unauthorized attempt, access to the data in the data storage device is denied.

As used herein, the singular "a" and "an" may be construed as including the plural "one or more" unless clearly indicated otherwise. This disclosure has been presented for purposes of illustration and description but is not intended to be exhaustive or limiting. Many modifications and variations will be apparent to those of ordinary skill in the art. The example embodiments were chosen and described in order to explain principles and practical applications, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one skilled in the art without departing from the scope or spirit of the disclosure.

What is claimed is:

1. A computing apparatus comprising:
   a housing;
   a data storage device disposed in the housing;
   a cover movably coupled to the housing to secure the data storage device in the housing;
   a controller coupled to the data storage device;

a lock configured to secure the cover to the housing;
a first switch coupled to the lock and the controller; and
an identification device coupled to the controller;
wherein the controller is configured to grant access to the data storage device upon detecting an authorized attempt of opening the cover after the controller receives both a first signal from the first switch upon the first switch being triggered by a key unlocking the lock and an acceptance signal received by the controller from the identification device upon the identification device receiving authorized identification information, and to deny access to the data storage device upon detecting an unauthorized attempt of opening the cover in an absence of at least one of the first signal and the acceptance signal.

2. The computing apparatus of claim 1, further comprising a second switch coupled to the cover and the controller, wherein the authorized attempt comprises a second signal received by the controller from the second switch upon the second switch detecting an opening of the cover after the controller receives the first signal and the acceptance signal and the unauthorized attempt comprises the second signal received by the controller from the second switch upon the second switch detecting an opening of the cover prior to receiving both the first signal and the acceptance signal.

3. The computing apparatus of claim 1, further comprising a sensor coupled to the housing and the controller, wherein the unauthorized attempt comprises a sensor signal received by the controller from the sensor upon the sensor detecting a movement of the housing prior to receiving both the first signal and the acceptance signal and wherein the authorized attempt comprises the sensor signal received by the controller from the sensor upon the sensor detecting movement of the housing after receiving both the first signal and the acceptance signal.

4. The computing apparatus of claim 3, wherein movement of the housing comprises movement of the housing exceeding a predetermined threshold distance.

5. The computing apparatus of claim 4, wherein the controller is operable to configure the predetermined threshold distance.

6. The computing apparatus of claim 1, wherein the data storage device comprises a self-encrypting drive and denying access to the data storage device comprises encrypting data stored in the data storage device.

7. The computing apparatus of claim 1, wherein the identification device comprises a Near Field Communication ("NFC") reader, a keypad, a socket for receiving a dongle, a camera for capturing a code and/or a fingerprint reader.

8. A method for securing access to a computing device, the method comprising:
detecting an attempt of opening a cover of the computing device having a data storage device disposed therein;
determining a nature of the attempt;
granting access to the data storage device upon the nature being determined as an authorized attempt, and
denying access to the data storage device upon the nature being determined as an unauthorized attempt,
wherein the authorized attempt comprises receiving a first signal from a first switch, the first signal transmitted in response to a key unlocking a lock coupled to the first switch, and receiving an acceptance signal from an identification device in response to the identification device receiving authorized identification information prior to detecting the attempt of opening the cover, and wherein the unauthorized attempt comprises detecting the attempt of opening the cover in an absence of at least one of the first signal and the acceptance signal.

9. The method of claim 8, wherein the authorized attempt is determined upon presence of an identification card presented to the identification device.

10. The method of claim 9, wherein the unauthorized attempt is determined in absence of the identification card.

11. The computing apparatus of claim 8, wherein the data storage device comprises a self-encrypting drive and denying access to the data storage device comprises encrypting data stored in the data storage device.

12. The computing apparatus of claim 8, wherein the identification device comprises a Near Field Communication ("NFC") reader, a keypad, a socket for receiving a dongle, a camera for capturing a code and/or a fingerprint reader.

13. A computing apparatus comprising:
a housing;
a data storage device within the housing and in communication with a processor;
a cover movably coupled to the housing, the cover securing the data storage device within the housing;
a lock to secure the cover to the housing;
a first switch coupled to the lock and the controller; and
an identification device coupled to the controller;
a controller within the housing and in communication with the data storage device, wherein the controller is configured to grant access to the data storage device upon detecting an authorized attempt of opening the cover and to deny access to the data storage device upon detecting an unauthorized attempt of opening the cover, the authorized attempt comprising the controller receiving a first signal from the first switch upon the first switch being triggered by a key unlocking the lock and an acceptance signal received by the controller from the identification device upon the identification device receiving authorized identification information prior to detecting the attempt to open the cover and the unauthorized attempt of opening the cover comprising detecting the attempt to open the cover without first receiving both the first signal and the acceptance signal.

14. The computing apparatus of claim 13, wherein the lock is configured to secure the cover to the housing in a locked condition, wherein unlocking the lock is configured to activate the first switch and the first switch is configured to send the first signal to the controller in response to activation of the first switch.

15. The computing apparatus of claim 14, further comprising a second switch positioned to detect the cover being moved away from the housing toward an open position and wherein the second switch is configured to send a second signal to the controller in response to the second switch detecting movement of the cover away from the housing a predetermined threshold distance.

16. The computing apparatus of claim 15, wherein the identification device is configured to send the acceptance signal to the controller in response to receiving an authorized identification.

17. The computing apparatus of claim 13, wherein the data storage device comprises a self-encrypting drive and denying access to the data storage device comprises encrypting data stored in the data storage device.

18. The computing apparatus of claim 13, wherein the identification device comprises a Near Field Communication ("NFC") reader, a keypad, a socket for receiving a dongle, a camera for capturing a code and/or a fingerprint reader.

19. The computing apparatus of claim 13, wherein the processor is within the housing in a controller.

\* \* \* \* \*